US010368396B2

(12) United States Patent
Duce et al.

(10) Patent No.: US 10,368,396 B2
(45) Date of Patent: Jul. 30, 2019

(54) HEAT PIPE WITH PRINTED HEATER AND ASSOCIATED METHODS FOR MANUFACTURING

(71) Applicant: The Boeing Company, Chicago, IL (US)

(72) Inventors: Jeffrey L. Duce, Maple Valley, WA (US); Christopher D. Courter, Torrance, CA (US)

(73) Assignee: The Boeing Company, Chicago, IL (US)

(*) Notice: Subject to any disclaimer, the term of this patent is extended or adjusted under 35 U.S.C. 154(b) by 561 days.

(21) Appl. No.: 15/088,396

(22) Filed: Apr. 1, 2016

(65) Prior Publication Data
US 2017/0290096 A1    Oct. 5, 2017

(51) Int. Cl.
*H05B 3/12*    (2006.01)
*H05B 3/00*    (2006.01)
(Continued)

(52) U.S. Cl.
CPC ............. *H05B 3/0014* (2013.01); *B64G 1/50* (2013.01); *B64G 1/506* (2013.01); *C23C 28/321* (2013.01); *C23C 28/34* (2013.01); *F28D 15/02* (2013.01); *H05B 3/12* (2013.01); *H05B 3/16* (2013.01); *H05B 3/46* (2013.01); *F24D 2220/07* (2013.01); *F28D 2021/0021* (2013.01);
(Continued)

(58) Field of Classification Search
CPC .......... H05B 3/0014; H05B 3/12; H05B 3/16; H05B 3/46; H05B 2203/005; H05B 2203/021; H05B 2203/022; B64G 1/50; B64G 1/506; F28D 15/02; F28D 2021/0021; F28D 2021/0035
See application file for complete search history.

(56) References Cited

U.S. PATENT DOCUMENTS

| 3,489,203 A |  | 1/1970 | Fischell |
|---|---|---|---|
| 4,139,763 A | * | 2/1979 | McMullan ............... H05B 3/34 219/212 |

(Continued)

FOREIGN PATENT DOCUMENTS

| DE | 102008058529 A1 | 5/2010 |
|---|---|---|
| EP | 1366990 | 12/2003 |

(Continued)

OTHER PUBLICATIONS

Extended European Search Report for European Patent Application No. 16159893.3 dated Jul. 20, 2016.
(Continued)

*Primary Examiner* — Brian W Jennison
(74) *Attorney, Agent, or Firm* — Kunzler Bean & Adamson (57) ABSTRACT

Described herein is a heater for space equipment that includes a heat pipe. The heater also includes a first layer applied to the heat pipe. The first layer may be made from an electrically non-conductive material. The heater additionally includes a resistance heater printed onto the first layer after the first layer is applied to the heat pipe. The heater includes a second layer adjacent the resistance heater. The resistance heater may be positioned between the first layer and the second layer, and the second layer may be made from an electrically non-conductive material.

20 Claims, 9 Drawing Sheets

(51) Int. Cl.
*B64G 1/50* (2006.01)
*C23C 28/00* (2006.01)
*H05B 3/16* (2006.01)
*H05B 3/46* (2006.01)
*F28D 15/02* (2006.01)
*F28D 21/00* (2006.01)

(52) U.S. Cl.
CPC ............ *F28D 2021/0035* (2013.01); *H05B 2203/005* (2013.01); *H05B 2203/013* (2013.01); *H05B 2203/021* (2013.01); *H05B 2203/022* (2013.01)

(56) References Cited

U.S. PATENT DOCUMENTS

| | | | |
|---|---|---|---|
| 4,284,443 | A | 8/1981 | Hilton |
| 5,408,069 | A | 4/1995 | Mischel, Jr. |
| 5,565,124 | A | 10/1996 | Balzano |
| 5,753,893 | A * | 5/1998 | Noda ............ C04B 35/111 219/548 |
| 8,575,523 | B2 | 11/2013 | Chivers et al. |
| 9,161,393 | B2 | 10/2015 | Kaiserman et al. |
| 2002/0027133 | A1 | 3/2002 | Kellogg et al. |
| 2002/0043525 | A1 | 4/2002 | Laken et al. |
| 2003/0149505 | A1 | 8/2003 | Mogensen |
| 2004/0100131 | A1 | 5/2004 | Howick et al. |
| 2004/0155020 | A1 | 8/2004 | Worrell et al. |
| 2006/0191887 | A1 * | 8/2006 | Baer ............ B01J 19/0093 219/219 |
| 2009/0266810 | A1 * | 10/2009 | Chivers ............ H05B 3/34 219/542 |
| 2010/0065542 | A1 | 3/2010 | Dubey |
| 2011/0226751 | A1 | 9/2011 | Lazanja et al. |
| 2016/0270152 | A1 | 9/2016 | Duce et al. |
| 2016/0270153 | A1 | 9/2016 | Duce et al. |
| 2018/0172172 | A1 | 6/2018 | Oehler et al. |

FOREIGN PATENT DOCUMENTS

| | | |
|---|---|---|
| FR | 2905933 | 3/2008 |
| WO | 2010111364 | 9/2010 |

OTHER PUBLICATIONS

Notice of Allowance for U.S. Appl. No. 14/656,220 dated Apr. 27, 2016.
Extended European Search Report for European Patent Application No. 17162125.3 dated Sep. 25, 2017.
U.S. Appl. No. 14/656,220, filed Mar. 12, 2015.
U.S. Appl. No. 15/069,800, filed Mar. 14, 2016.

* cited by examiner

HEAT PIPE WITH PRINTED HEATER AND ASSOCIATED METHODS FOR MANUFACTURING

FIELD

This disclosure relates generally to components for vehicles, and more particularly to a heat pipe with a heater directly printed thereon for use in space equipment.

BACKGROUND

Conventional resistance heaters may be used in space equipment. Many resistance heaters are preformed, stand-alone heaters made from materials and processes that render the heaters less conducive to post-manufacturing integration onto components for space equipment. For example, some conventional resistance heaters use an adhesive to attach the convention resistance heaters to components for space equipment, such as an adhesive to attach a convention resistance heater to a heat pipe.

Attaching conventional resistance heaters to a heat pipe may be time consuming. Moreover, conventional resistance heaters that are attached to a heat pipe may take up a large amount of space and inefficiently consume power.

SUMMARY

The subject matter of the present application provides embodiments of heat pipes with heaters printed directly thereon, and associated methods for manufacturing, that overcome the above-discussed shortcomings of prior art techniques. The subject matter of the present application has been developed in response to the present state of the art, and in particular, in response to shortcomings of conventional heaters attached to space equipment.

According to one embodiment, a heater for space equipment includes a heat pipe. The heater also includes a first layer applied to the heat pipe. The first layer may be made from an electrically non-conductive material. The heater additionally includes a resistance heater printed onto the first layer after the first layer is applied to the heat pipe. The heater includes a second layer adjacent the resistance heater. The resistance heater may be positioned between the first layer and the second layer, and the second layer may be made from an electrically non-conductive material.

In some implementations of the heater, the resistance heater includes a first conductor printed onto the first layer and a second conductor printed onto the first conductor. The first conductor may be made from a first metal and the second conductor may be made from a second metal different than the first metal. The first metal may include copper and the second metal may include a resistive metal like nichrome.

According to certain implementations of the heater, at least one of the first layer and the second layer includes a printed ceramic layer.

In certain implementations of the heater, the heater includes an electrostatic dissipation layer applied over the second layer.

According to yet some implementations, the heater includes multiple plies. The first layer includes a first ply of the multiple plies, the resistance heater includes at least a second ply of the multiple plies, and the second layer includes a third ply of the multiple plies. At least one of the first ply and third ply may include a ceramic ply.

In another embodiment, a vehicle includes a heat pipe including multiple plies printed thereon. The multiple plies include a first ply made from an electrically non-conductive material, a second ply applied onto the first ply and made from a first electrically conductive metal, and a third ply applied onto the second ply and made from a second electrically conductive metal. The vehicle includes at least two electrically conductive contacts coupled to the second ply. The vehicle further includes an electrical power source coupled to the at least two electrically conductive contacts. The electrical power source supplies power to the second ply via the at least two electrically conductive contacts.

According to some implementations of the vehicle, the electrical power source supplies a constant voltage to the second ply at or above an equilibrium voltage corresponding to an equilibrium temperature of the third ply.

In certain implementations of the vehicle, the multiple plies has a planar shape.

According to some implementations of the vehicle, the multiple plies includes a fourth ply applied onto the third ply and made from an electrically non-conductive material. The first ply and fourth ply sandwich the second ply and third ply.

In some implementations of the vehicle, at least one of the multiple plies includes a ceramic ply.

According to yet another embodiment, a method of making a heater for heating equipment in space includes providing a heat pipe. The heat pipe may be configured to contain a fluid that flows through the heat pipe to facilitate heat transfer. The method also includes applying a first electrically non-conductive layer onto the heat pipe, printing a resistance heater onto the first electrically non-conductive layer after applying the first electrically non-conductive layer onto the heat pipe, and applying a second electrically non-conductive layer onto the resistance heater to form the heater.

In some implementations of the method, printing the resistance heater onto the first electrically non-conductive layer includes printing an electrically conductive layer onto the first electrically non-conductive layer using a first conductive material, and printing a heater layer onto the electrically conductive layer using a second conductive material. Applying the first electrically non-conductive layer onto the heat pipe may include printing the first electrically non-conductive layer onto the heat pipe. Applying the second electrically non-conductive layer onto the resistance heater may include printing the second electrically non-conductive layer onto the resistance heater.

According to certain implementations of the method, the first electrically non-conductive layer includes a ceramic.

In some implementations, the method also includes printing a thermocouple onto the first electrically non-conductive layer. The method can further include applying an overcoat over the second electrically non-conductive layer. The overcoat may be a conductive electrostatic dissipation layer.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
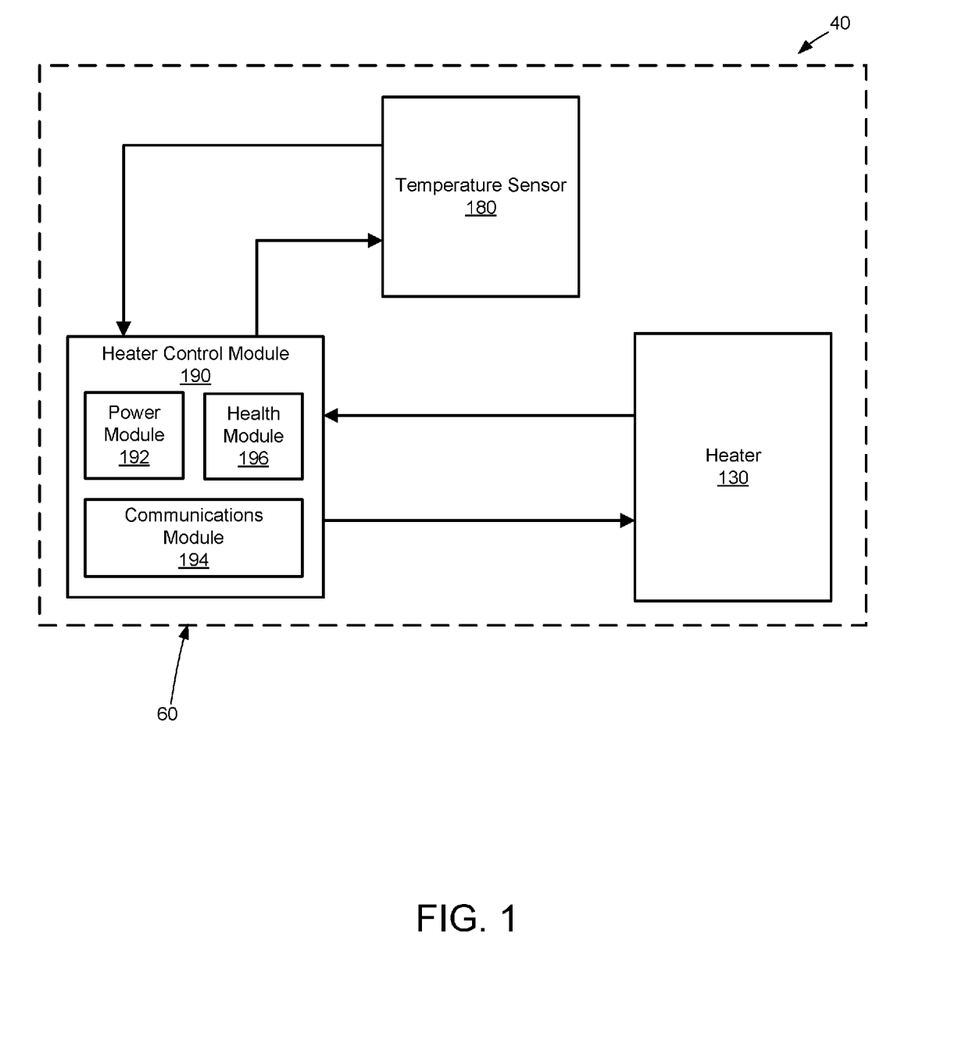
FIG. 1 is a schematic block diagram of a temperature control system for controlling heat of equipment, according to one or more embodiments of the present disclosure.

As shown in FIG. 1, and according to one embodiment, a temperature control system 40 of space equipment, such as a vehicle (e.g., a spacecraft) or an orbiting structure (e.g., satellite, space station), includes an integrated heater system 60. Portions of the integrated heater system 60 are printed onto a heat pipe. In the illustrated implementation, the integrated heater system 60 includes a resistance heater 130, a temperature sensor 180, and a heater control module 190. The heater control module 190 includes hardware (e.g., circuits, relays, switches, digital I/O connectors, and the like) and logic that controls operation of the heater control module 190. In some implementations, the heater control module 190 is a thin-film flexible microchip, including, in one implementation, multiple transistors printed onto a flexible substrate. Generally, the heater control module 190 supplies electrical power to the resistance heater 130 that converts the electrical power into heat. The heat generated by the resistance heater 130 can vary in response to the voltage of the electrical power supplied from the heater control module 190. Accordingly, a power module 192 of the heater control module 190 is configured to regulate (e.g., vary or modulate) the heat generated by the resistance heater 130 by regulating the voltage of the electrical power supplied to the resistance heater 130. The operations of the power module 192, and other operations of the heater control module 190, can be commanded via digital signals, such as pulse width modulation signals.

The temperature sensor 180 can be any of various temperature sensors configured to measure the temperature provided by the resistance heater 130 in order to regulate the temperature of the resistance heater 130 to a desired temperature. The temperature sensor 180 may be a thermocouple, a digital temperature sensor, or any other temperature sensor.

In some implementations, the communications module 194 includes hardware, such as antenna, transceivers, network interface controllers, and the like, for facilitating the receipt and transmission of electronic data communications.

In certain embodiments, the heater control module 190 further includes a health module 196 that monitors one or more health conditions of the integrated heater system 60, including the resistance heater 130, and communicates the monitored health condition(s) to another device via the communications module 194. According to some implementations, the health module 196 continuously communicates health conditions to another device. Alternatively, the health module 196 may communicate health conditions to another device only when the health conditions meet a threshold. In response to the monitored health conditions, such as when a health condition meets a threshold, another device may permanently or temporarily disable operation of the integrated heater system 60. The health condition(s) monitored by the health module 196 may be any of various conditions related to the performance, function, and/or safety of the resistance heater 130. For example, the health condition can be a temperature of the resistance heater 130 (which may be measured by the temperature sensor 180) and the threshold may be a maximum allowable temperature of the resistance heater 130. According to some embodiments, the heater control module 190 is operable to disable operation of the integrated heater system 60 when a health condition meets a threshold.

Figure 2:
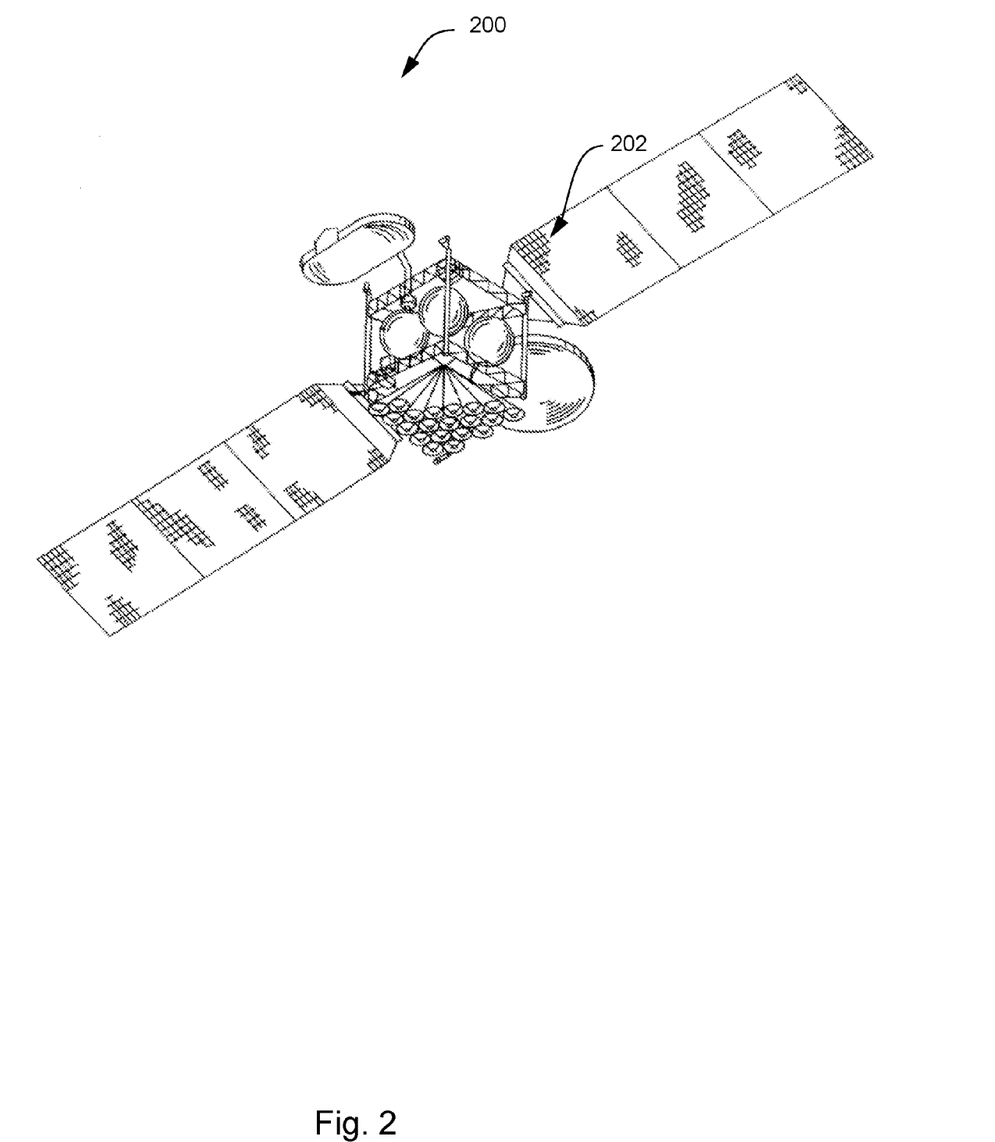
FIG. 2 is a perspective view of space equipment that includes a heat pipe with a printed heater, according to one or more embodiments of the present disclosure.

Referring to FIG. 2, and according to one embodiment, space equipment 200 may include a heat pipe 202 that may have a temperature controlled by a temperature control system, such as the temperature control system 40. As illustrated, the space equipment 200 may be a satellite, or the space equipment 200 may be any suitable equipment operable in space like environments (e.g., rockets, missiles, space stations, space vehicles, space simulators). In certain embodiments, the heat pipe 202 may include a heater printed directly on the heat pipe 202 so that adhesive is not used. Such a printed heater may be substantially smaller than a heater that is adhesively attached to a heat pipe 202. For example, the printed heater may be approximately ⅛ or ¹⁄₁₀ of the size of a heater that is adhesively attached to the heat pipe 202. Furthermore, the printed heater may include fewer heat elements than an adhesively attached heater. Accordingly, the printed heater may use less power to provide heat to the heat pipe than an adhesively attached heater. It should be noted that, while the heat pipe 202 is illustrated as being part of the space equipment 200, the heat pipe 202 may be part of any suitable device, such as a device manufactured to operate in a wide range of temperatures.

Figure 3:
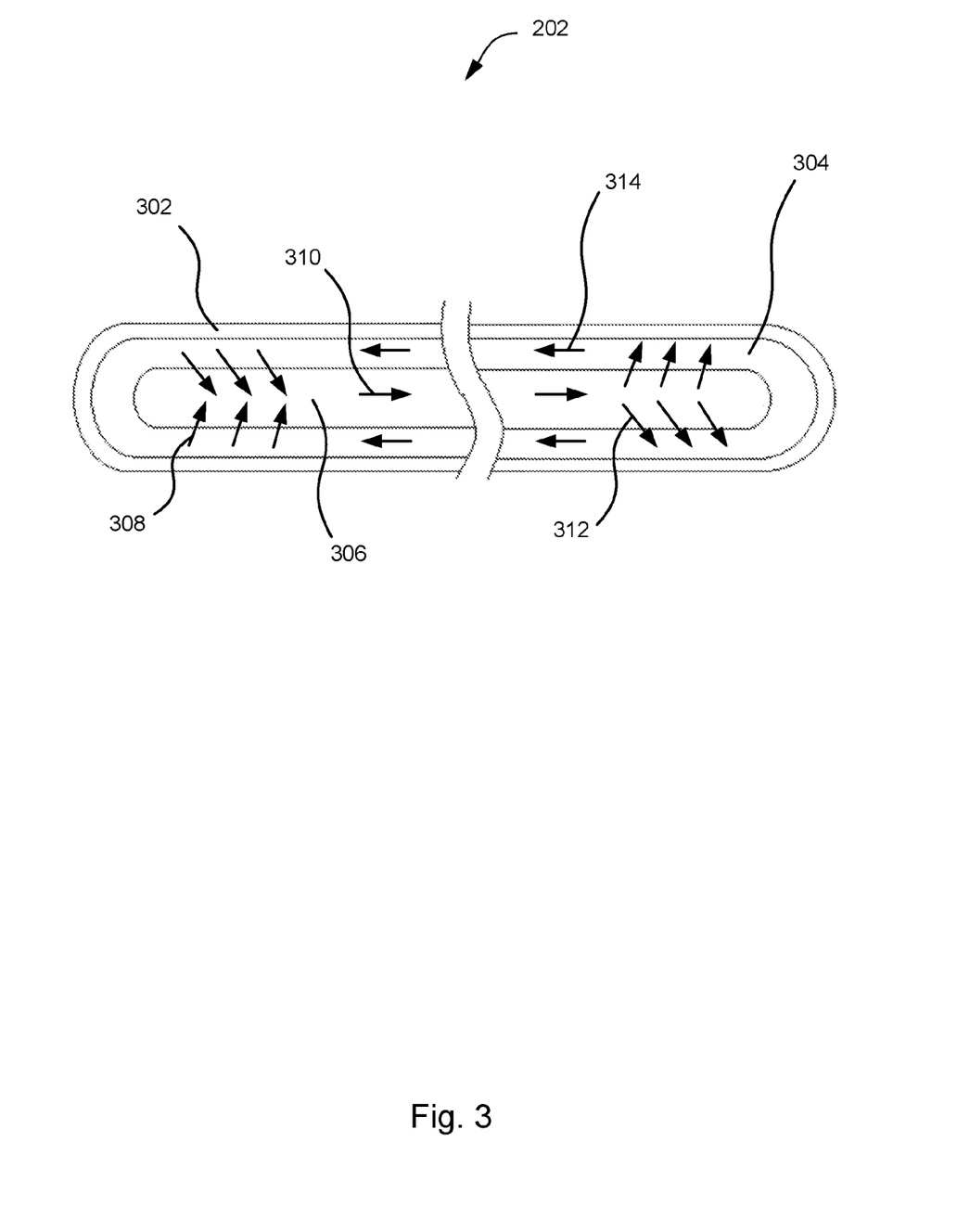
FIG. 3 is a cross-sectional view of an embodiment of a heat pipe that may include a printed heater, according to one or more embodiments of the present disclosure.

Referring to FIG. 3, one embodiment of a cross-sectional view of the heat pipe 202 that may include a printed heater is illustrated. The heat pipe 202 may be configured to contain a fluid that flows through the heat pipe 202 to facilitate heat transfer. Specifically, one implementation of the heat pipe 202 includes an outer casing 302, a wick 304, and a vapor cavity 306. The outer casing 302 and the wick 304 may be formed from a heat conductive material, such as metals including aluminum, copper, and steel. The vapor cavity 306 is a hollow portion enclosed by the outer casing 302 and the wick 304. The outer casing 302 of the heat pipe 202 may have any shape, such as being substantially flat on two sides, being substantially round, being substantially oval shaped, and so forth.

Fluid may exchange heat with the outer casing 302 by the following cycle, for example. Fluid may evaporate 308 after absorbing thermal energy from the outer casing 302 thereby flowing from the wick 304 to the vapor cavity 306. The vaporized fluid may migrate 310 along the vapor cavity 306 to a lower temperature portion of the heat pipe 202. The vaporized fluid may condense 312 back to a liquid and be absorbed by the wick 304, thereby releasing thermal energy. The liquid fluid may migrate 310 along the wick 304 to a higher temperature portion of the heat pipe 202 where the cycle repeats.

Figure 4:
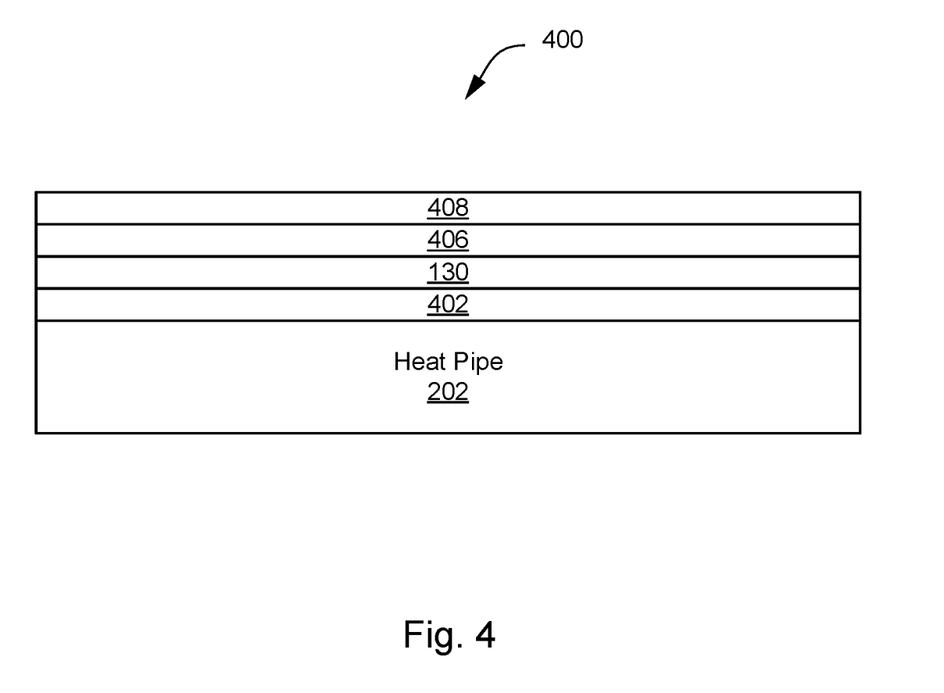
FIG. 4 is a cross-sectional view of a printed heater on a heat pipe, according to one or more embodiments of the present disclosure.

Turning to FIG. 4, a cross-sectional view of a printed heater 400 on a heat pipe 202 is illustrated. The printed heater 400 includes a first layer 402 printed onto the heat pipe 202, a resistance heater 130 printed onto the first layer 210, a second layer 406 printed onto the resistance heater 404, and an overcoat 408 printed onto the second layer 406. In some implementations, the various layers may be printed using a direct write technology that may print using a rapidly condensed plasma.

The first layer 402 or first ply is made from an electrically non-conductive material, such as, for example, fiberglass, plastic, ceramic, silicone, fabric, and the like. In one implementation, the first layer 402 is a thin film with a thickness in the range of between a nanometer and several micrometers. In other implementations, the first layer 402 has a thickness greater than several micrometers. As shown, in one configuration, the first layer 402 has a substantially planar shape. The first layer 402 may be substantially rigid or non-flexible in some implementations. However, in certain other implementations, the first layer 402 is made from a non-rigid flexible material such that it can be flexed or moved into a non-planar shape.

Figure 5A:
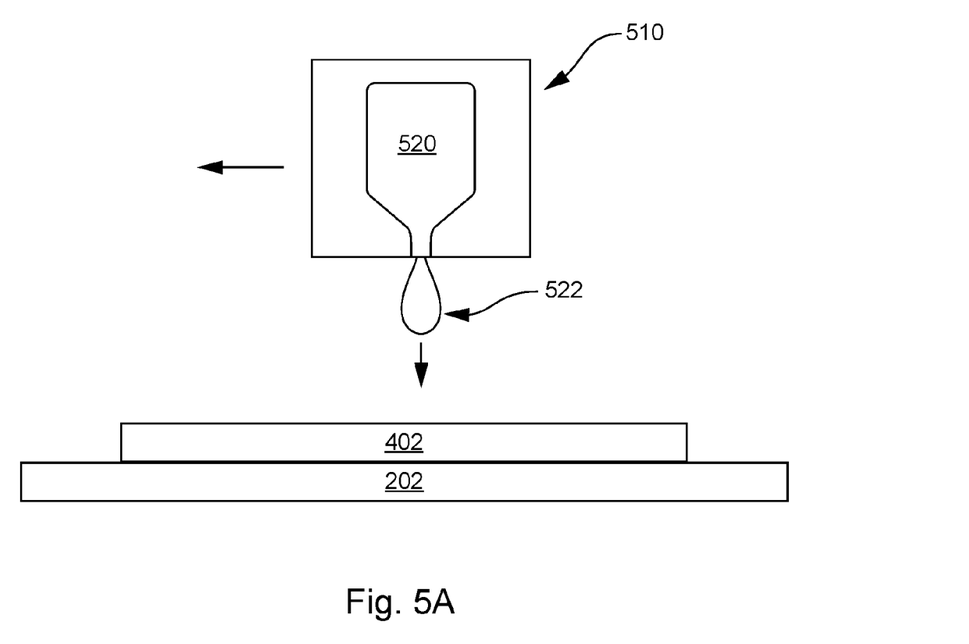
FIG. 5A is a schematic side elevation view of a system for printing a first non-conductive layer onto a heat pipe, according to one or more embodiments of the present disclosure.
Figure 5B:
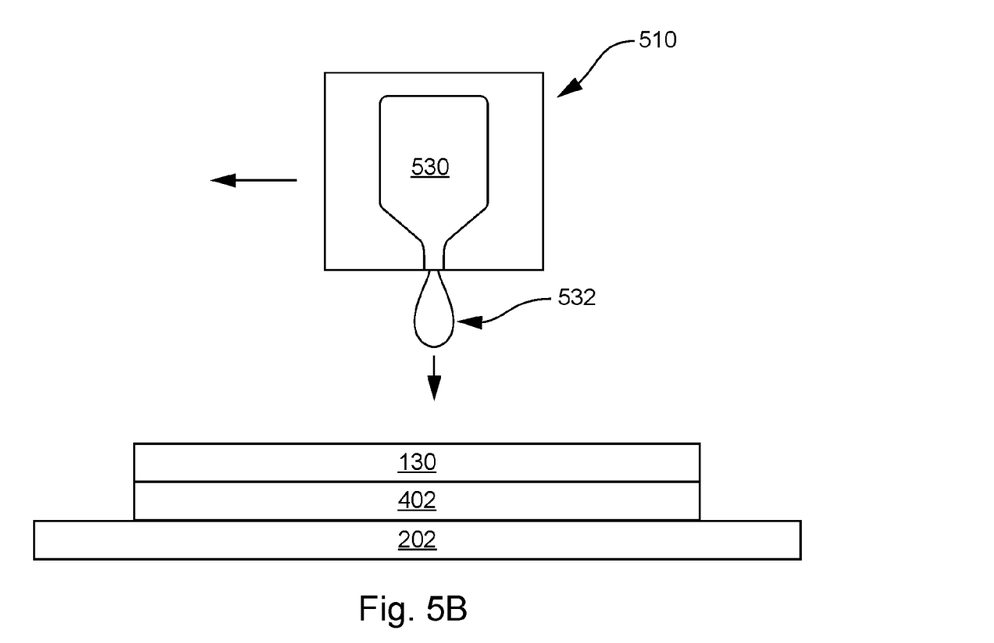
FIG. 5B is a schematic side elevation view of a system for printing a resistance heater onto the first non-conductive layer of FIG. 5A, according to one or more embodiments of the present disclosure.
Figure 5C:
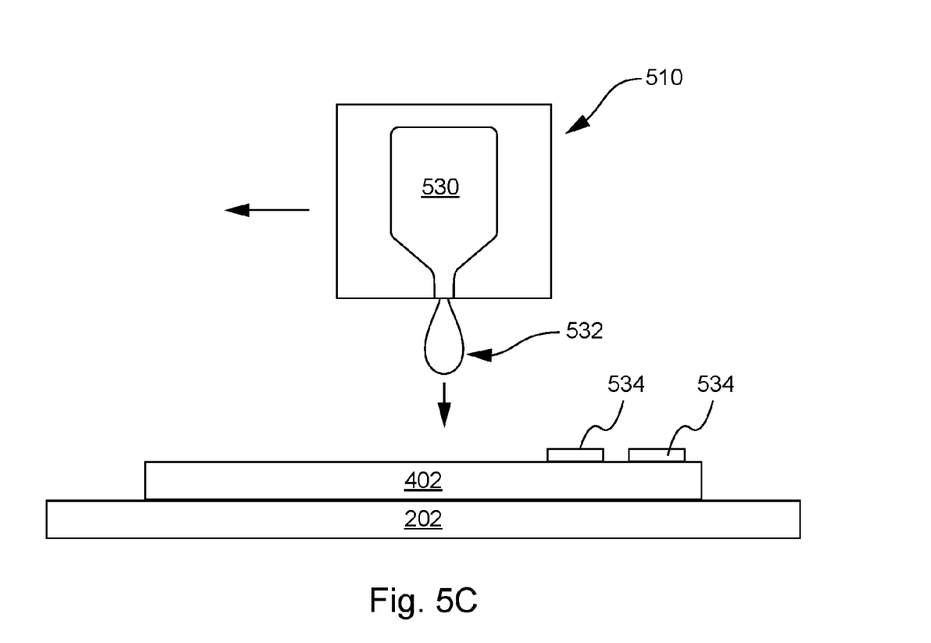
FIG. 5C is a schematic side elevation view of a system for printing an electrically conductive layer of the resistance heater of FIG. 5B onto the first non-conductive layer of FIG. 5A, according to one or more embodiments of the present disclosure.
Figure 5D:
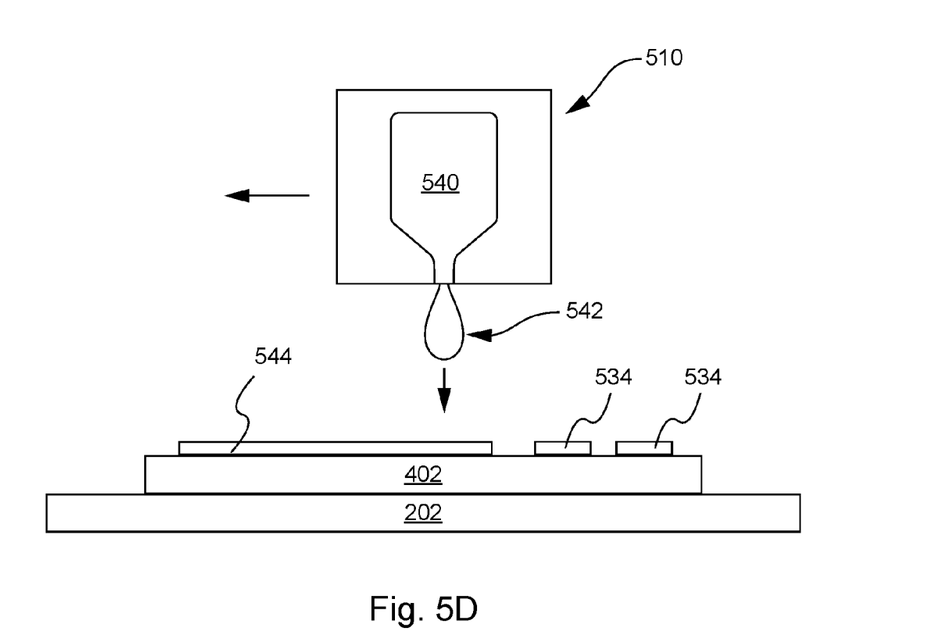
FIG. 5D is a schematic side elevation view of a system for printing a heater layer of the resistance heater of FIG. 5B, according to one or more embodiments of the present disclosure.

The resistance heater 130 or second ply includes a first conductor printed onto the first layer 402 and a second conductor printed onto the first conductor, as illustrated in FIGS. 5C and 5D. In certain implementations, the first and second conductors may be considered separate plies. In one implementation as shown, the first and second conductors of the resistance heater 130 have a substantially planar shape. The first conductor is made from a first metal and the second conductor is made from a second metal. The first metal may be different than the second metal. In various implementations, the first and second metals may include one or more of silver, copper, gold, aluminum, zinc, nickel, brass, bronze, iron, platinum, steel, lead, kanthal, nichrome, cupronickel, a nickel alloy, and any of various resistive metals. The first and second conductors may be a plasma in a printing state and are solid in a post-printing state following printing and drying.

The second layer 406 or third ply is made from an electrically non-conductive material similarly to the first layer 402, such as, for example, fiberglass, plastic, ceramic, silicone, fabric, and the like. In one implementation, the second layer 406 is a thin film with a thickness in the range of between a nanometer and several micrometers. In other implementations, the second layer 406 has a thickness greater than several micrometers. As shown, in one configuration, the second layer 406 has a substantially planar shape. The second layer 406 may be substantially rigid or non-flexible in some implementations. However, in certain other implementations, the second layer 406 is made from a non-rigid flexible material such that it can be flexed or moved into a non-planar shape.

The overcoat 408 or fourth ply is made from a conductive primer and may include an electrostatic dissipation material. For example, the overcoat 408 may include materials, such as, for example, an epoxy, a urethane, licron, and the like.

Referring to FIGS. 5A through 5F, in one embodiment, the printed heater 400 may be printed onto the heat pipe 202 using at least one printing head. In the illustrated embodiment, a printer (not shown) includes one or more printing heads 510 for printing the first and second layers 402, 406, the resistance heater 130, and the overcoat 408. As shown in FIG. 5A, the one or more printing heads 510 include a first material source 520 containing a first material and a nozzle for dispensing a first material 522 from the first material source 520. As shown by directional arrows, the one or more printing heads 510 move translationally relative to (e.g., parallel to) a surface of the heat pipe 202 onto which the first layer 402 is to be printed. As the one or more printing heads 510 move along the surface of the heat pipe 202, the one or more printing heads 510 dispense the first material 522 onto the surface of the heat pipe 202 to form the first layer 402. Desirably, in some implementations, the one or more printing heads 510 dispenses a uniform thickness of the first material 522 onto the heat pipe 202 to form the first layer 402. The first material 522 is an electrically non-conductive material as described above.

As shown in FIG. 5B, after printing the first layer 402, the one or more printing heads 510, which include a second material source 530 containing a second material and a nozzle for dispensing a second material 532 from the second material source 530, moves translationally along a surface of the first layer 402 onto which the resistance heater 130 is to be printed. As the one or more printing heads 510 move along the surface of the first layer 402, the one or more printing heads 510 dispense the second material 532 onto the surface of the first layer 402 to form the resistance heater 130. Desirably, in some implementations, the one or more printing heads 510 dispense a uniform thickness of the second material 532 onto the first layer 402 to form the resistance heater 130. The second material 532 is a conductor (e.g., electrically conductive material) as described above.

In some embodiments, the one or more printing heads 510 may be used to print the temperature sensor 180 and/or heater control module 190 onto the first layer 402. For example, as the one or more printing heads 510 moves relative to the surface of the first layer 402, the one or more printing heads 510 dispenses one or more materials onto the surface of the first layer 402 to form the temperature sensor 180 and/or the heater control module 190. Alternatively, one or both of the temperature sensor 180 or heater control module 190 may be printed onto the first layer 402 during a different printing process, or preformed and electrically coupled to the resistance heater 130 prior to or after the resistance heater 130 is printed onto the first layer 402.

The resistance heater 130 may be printed using multiple printing steps. FIGS. 5C and 5D illustrate printing the resistance heater 130 using more than one printing step. As shown in FIG. 5C, after printing the first layer 402, the one or more printing heads 510, which include the second material source 530 containing a second material and a nozzle for dispensing the second material 532 from the second material source 530, moves translationally along a surface of the first layer 402 onto which a first conductive layer 534 is to be printed. As the one or more printing heads 510 move along the surface of the first layer 402, the one or more printing heads 510 dispense the second material 532 onto the surface of the first layer 402 to form the first conductive layer 534. Desirably, in some implementations, the one or more printing heads 510 dispense a uniform thickness of the second material 532 onto the first layer 402 to form the first conductive layer 534. The second material 532 is a conductor (e.g., electrically conductive material) as described above. In one implementation, the first conductive layer 534 includes circuitry used to couple resistive heater elements to a power source, among other things.

As shown in FIG. 5D, after printing the first conductive layer 534, the one or more printing heads 510, which include a third material source 540 containing a third material and a nozzle for dispensing the third material 542 from the third material source 540, moves translationally along a surface of the first conductive layer 534 onto which a second conductive layer 544 is to be printed. As the one or more printing heads 510 move along the surface of the first conductive layer 534, the one or more printing heads 510 dispense the third material 542 onto the surface of the first conductive layer 534 to form the second conductive layer 544. Desirably, in some implementations, the one or more printing heads 510 dispense a uniform thickness of the third material 542 onto the first conductive layer 534 to form the second conductive layer 544. The third material 542 is a conductor (e.g., electrically conductive material) as described above. In one implementation, the second conductive layer 544 includes resistive heater elements and/or a heater layer, among other things.

Figure 5E:
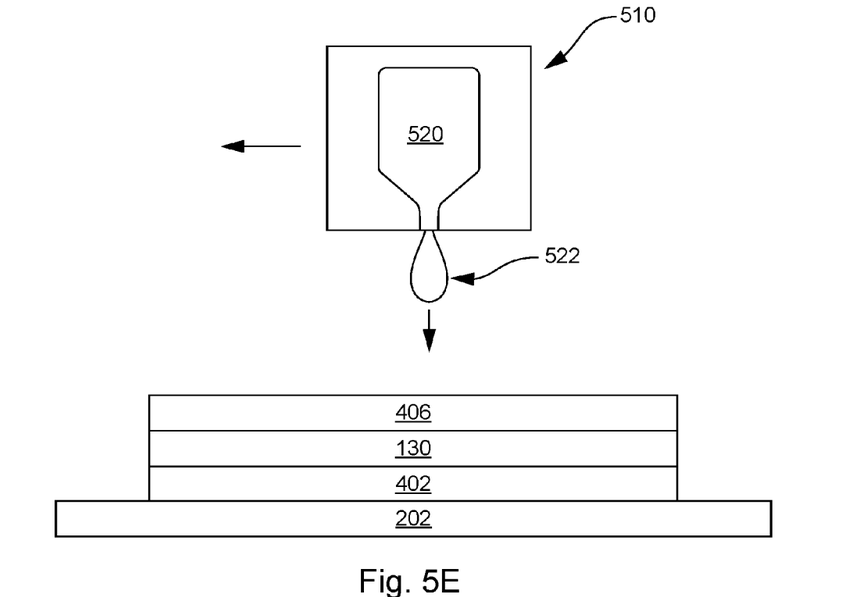
FIG. 5E is a schematic side elevation view of a system for printing a second non-conductive layer onto the resistance heater of FIG. 5B, according to one or more embodiments of the present disclosure.

As shown in FIG. 5E, the one or more printing heads 510 may again use the first material source 520 containing the first material and a nozzle for dispensing the first material 522 from the first material source 520. As shown by directional arrows, the one or more printing heads 510 move translationally relative to (e.g., parallel to) a surface of the resistance heater 130 onto which the second layer 406 is to be printed. As the one or more printing heads 510 move along the surface of the resistance heater 130, the one or more printing heads 510 dispense the first material 522 onto the surface of the resistance heater 130 to form the second layer 406. It should be noted that the first and second layers 402 and 406 sandwich the resistance heater 130. Desirably, in some implementations, the one or more printing heads 510 dispenses a uniform thickness of the first material 522 onto the resistance heater 130 to form the second layer 406. The first material 522 is an electrically non-conductive material as described above.

Figure 5F:
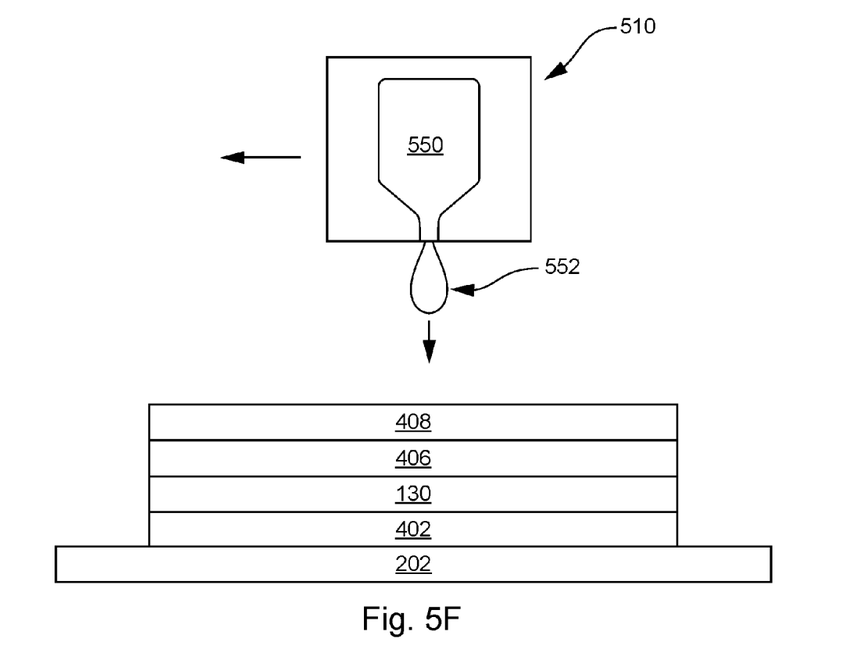
FIG. 5F is a schematic side elevation view of a system for printing an overcoat onto the second non-conductive layer of FIG. 5E, according to one or more embodiments of the present disclosure.

As shown in FIG. 5F, the one or more printing heads 510 include a fourth material source 550 containing a fourth material and a nozzle for dispensing a fourth material 552 from the fourth material source 550. As shown by directional arrows, the one or more printing heads 510 move translationally relative to (e.g., parallel to) a surface of the second layer 406 onto which the overlay 408 is to be printed. As the one or more printing heads 510 move along the surface of the second layer 406, the one or more printing heads 510 dispense the fourth material 552 onto the surface of the second layer 406 to form the overlay 408. Desirably, in some implementations, the one or more printing heads 510 dispenses a uniform thickness of the fourth material 552 onto the second layer 406 to form the overlay 408. The fourth material 552 may be made from a conductive primer and may include an electrostatic dissipation material as described above.

Figure 6:
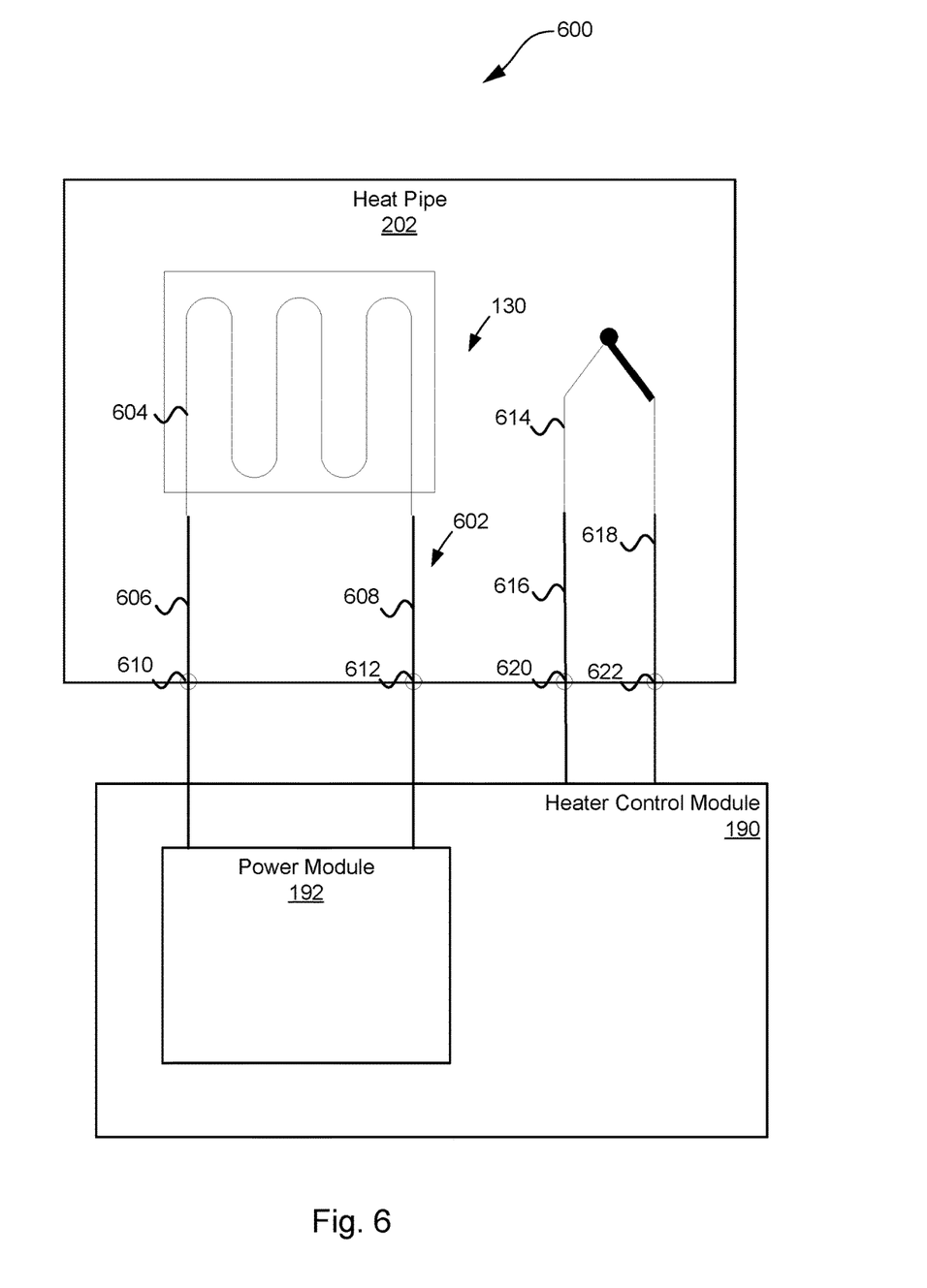
FIG. 6 a schematic block diagram of another temperature control system for controlling heat of equipment, according to one or more embodiments of the present disclosure.

Turning to FIG. 6, a schematic block diagram of another temperature control system 600 for controlling heat of equipment is illustrated. The temperature control system 600 includes the heat pipe 202 having the resistance heater 130 printed thereon.

Specifically, the resistance heater 130 includes a first conductor 602 (e.g., electrically conductive material) printed directly over the heat pipe 202 (e.g., as previously described, the first conductor 602 may be printed directly onto the first layer 402). The first conductor 602 may be made from a metal that may include one or more of silver, copper, gold, aluminum, zinc, nickel, brass, bronze, iron, platinum, steel, lead, kanthal, nichrome, cupronickel, a nickel alloy, and a resistive metal. The resistance heater 130 also includes a second conductor 604 (e.g., electrically conductive material) printed directly over the heat pipe 202. Specifically, the second conductor 604 may be printed directly onto the first layer 402 and/or the first conductor 602. In certain implementations, the first conductor 602 may be printed directly onto the first layer 402 and/or the second conductor 604. In various implementations, the first conductor 602 and the second conductor 604 contact one another to provide electrical conductivity between the first and second conductors 602, 604. The second conductor 604 may be made from a metal that may include one or more of silver, copper, gold, aluminum, zinc, nickel, brass, bronze, iron, platinum, steel, lead, kanthal, nichrome, cupronickel, a nickel alloy, and any of various resistive metal. In some implementations, the first and second conductors 602, 604 may be made from different materials. In one implementation, the first conductor 602 includes copper and the second conductor 604 includes nichrome or any of various resistive metals like nichrome.

The first conductor 602 includes a first conductive trace 606 and a second conductive trace 608 used to direct power to the second conductor 604. Moreover, the second conductor 604 is a heater layer, such as a resistance heater element. A first contact 610 electrically coupled to the first conductive trace 606 and a second contact 612 electrically coupled to the second conductive trace 608 facilitate connecting the power module 192 (e.g., electrical power source) to the second conductor 604 to provide power to the second conductor 604. As previously described, the heater control module 190 may control the power module 192 to provide a desired amount of power to the resistance heater 130. In some implementations, the power module 192 may supply a constant voltage to the resistance heater 130 at or above an equilibrium voltage corresponding to an equilibrium temperature.

To facilitate controlling the voltage supplied to the resistance heater 130, a thermocouple 614 may be printed over the heat pipe 202. Specifically, the thermocouple 614 may be printed directly onto the first layer 402. The thermocouple 614 includes a first conductive trace 616 and a second conductive trace 618 used to direct power to the thermocouple 614. A first contact 620 electrically coupled to the first conductive trace 616 and a second contact 622 electrically coupled to the second conductive trace 618 facilitate connecting the heater control module 190 to the thermocouple 614 to operate and/or monitor the thermocouple 614. As previously described, the heater control module 190 may use the temperature monitored from the thermocouple 614 to control the amount of power supplied to the resistance heater 130.

Figure 7:
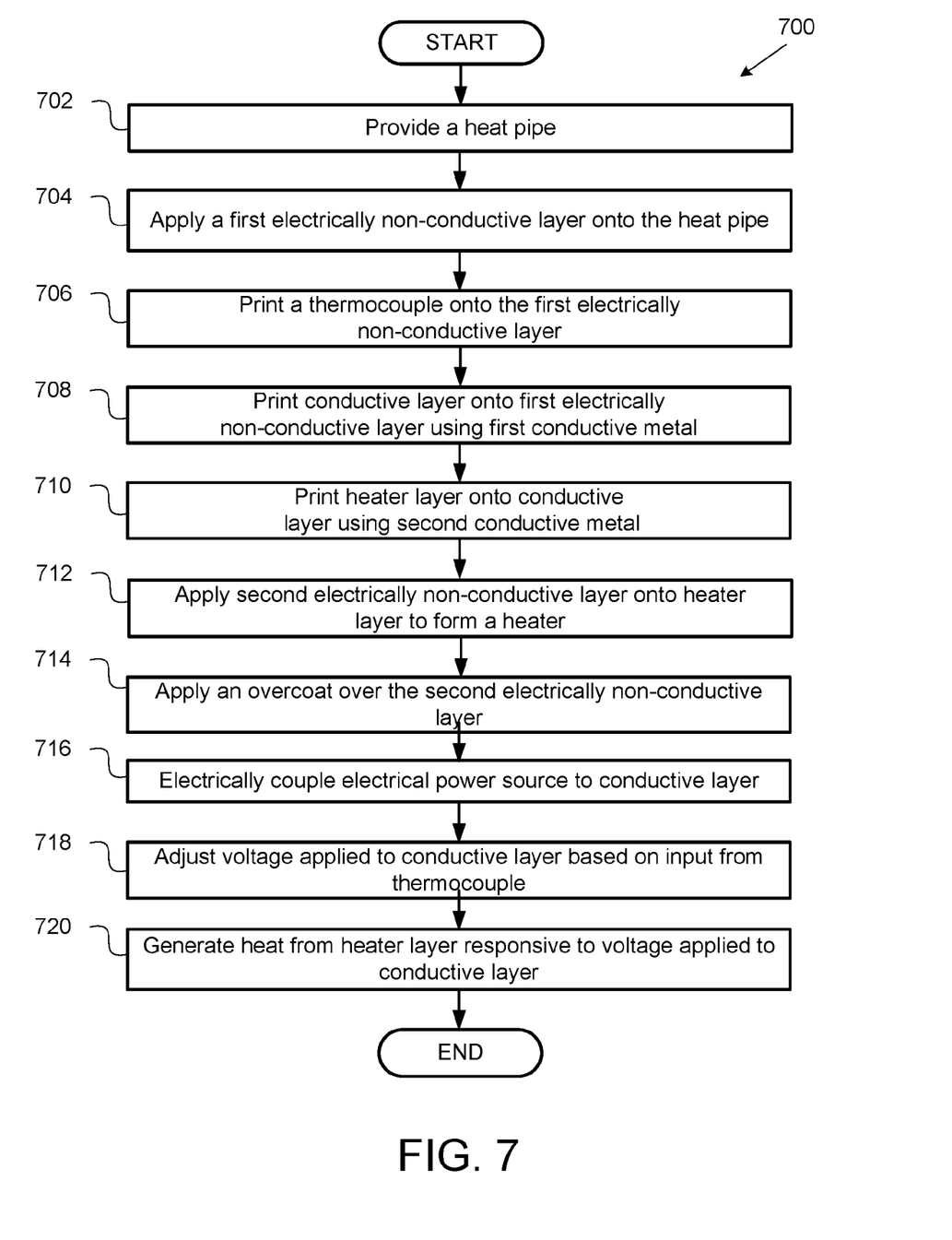
FIG. 7 is a schematic flow diagram of a method of making and using a heater for space equipment, according to one or more embodiments of the present disclosure.

Referring to FIG. 7, one embodiment of a method 700 of making and using a heater for space equipment is shown. The method 700 includes providing a heat pipe, which may be configured to contain a fluid that flows through the heat pipe to facilitate heat transfer, at 702. Additionally, the method 700 includes applying a first electrically non-conductive layer onto the heat pipe at 704. In some implementations, applying the first electrically non-conductive layer onto the heat pipe may include printing the first electrically non-conductive layer onto the heat pipe. Then, the method 700 may include printing a thermocouple onto the first electrically non-conductive layer at 706. The method 700 also includes printing a resistance heater onto the first electrically non-conductive layer after applying the first electrically non-conductive layer onto the heat pipe by: printing an electrically conductive layer onto the first electrically non-conductive layer using a first conductive material at 708; and printing a heater layer onto the electrically conductive layer using a second conductive material at 710. The method 700 includes applying a second electrically non-conductive layer onto the resistance heater to form the heater at 712. In certain implementations, applying the second electrically non-conductive layer onto the resistance heater may include printing the second electrically non-conductive layer onto the resistance heater.

The method 700 may further include applying an overcoat over the second electrically non-conductive layer, which may be a conductive electrostatic dissipation layer, at 714. Also, the method 700 may include electrically coupling an electrical power source to the conductive layer at 716.

The method 700 also may include adjusting a voltage applied to the conductive layer based on input from a thermocouple at 718. The voltage may be an equilibrium voltage defined as a voltage sufficiently high that if constantly applied to the heater layer would allow the temperature of the heater layer to reach the equilibrium temperature. The method 700 additionally may include, at 720, generating heat from the heater layer responsive to the voltage applied to the conductive layer.

It should be noted that while many implementations included herein describe printing material onto a heat pipe to form a heater on the heat pipe, in some implementations, materials forming the heater may be printed on any suitable device having a planar surface, a rounded surface, or other type of surface.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:
1. A heater for space equipment, comprising:
a heat pipe;
a first layer applied to the heat pipe, the first layer made from an electrically non-conductive material;
a resistance heater printed onto the first layer after the first layer is applied to the heat pipe; and a second layer adjacent the resistance heater, the resistance heater being positioned between the first layer and the second layer, and the second layer being made from an electrically non-conductive material.

2. The heater of claim 1, wherein the resistance heater comprises a first conductor printed onto the first layer and a second conductor printed onto the first conductor, the first conductor being made from a first metal and the second conductor being made from a second metal different than the first metal.

3. The heater of claim 2, wherein the first metal comprises copper and the second metal comprises nichrome.

4. The heater of claim 1, wherein at least one of the first layer and the second layer comprises a printed ceramic layer.

5. The heater of claim 1, further comprising an electrostatic dissipation layer applied over the second layer.

6. The heater of claim 1, wherein the heater comprises a plurality of plies, and wherein the first layer comprises a first ply of the plurality of plies, the resistance heater comprises at least a second ply of the plurality of plies, and the second layer comprises a third ply of the plurality of plies.

7. The heater of claim 6, wherein at least one of the first ply and third ply comprises a ceramic ply.

8. A vehicle, comprising:
a heat pipe;
a plurality of plies printed on the heat pipe, wherein the plurality of plies comprises a first ply made from an electrically non-conductive material, a second ply applied onto the first ply and made from a first electrically conductive metal, and a third ply applied onto the second ply and made from a second electrically conductive metal;
at least two electrically conductive contacts coupled to the second ply; and
an electrical power source coupled to the at least two electrically conductive contacts, the electrical power source supplying power to the second ply via the at least two electrically conductive contacts.

9. The vehicle of claim 8, wherein the electrical power source supplies a constant voltage to the second ply at or above an equilibrium voltage corresponding to an equilibrium temperature of the third ply.

10. The vehicle of claim 8, wherein the plurality of plies has a planar shape.

11. The vehicle of claim 8, wherein the plurality of plies comprises a fourth ply applied onto the third ply and made from an electrically non-conductive material, the first ply and fourth ply sandwiching the second ply and third ply.

12. The vehicle of claim 8, wherein at least one of the plurality of plies comprises a ceramic ply.

13. A method of making a heater for heating equipment in space, comprising:
providing a heat pipe, wherein the heat pipe is configured to contain a fluid that flows through the heat pipe to facilitate heat transfer;
applying a first electrically non-conductive layer onto the heat pipe;
printing a resistance heater onto the first electrically non-conductive layer after applying the first electrically non-conductive layer onto the heat pipe; and
applying a second electrically non-conductive layer onto the resistance heater to form the heater.

14. The method of claim 13, wherein printing the resistance heater onto the first electrically non-conductive layer comprises:
printing an electrically conductive layer onto the first electrically non-conductive layer using a first conductive material; and
printing a heater layer onto the electrically conductive layer using a second conductive material.

15. The method of claim 13, wherein applying the first electrically non-conductive layer onto the heat pipe comprises printing the first electrically non-conductive layer onto the heat pipe.

16. The method of claim 15, wherein applying the second electrically non-conductive layer onto the resistance heater comprises printing the second electrically non-conductive layer onto the resistance heater.

17. The method of claim 15, wherein the first electrically non-conductive layer comprises a ceramic.

18. The method of claim 13, further comprising printing a thermocouple onto the first electrically non-conductive layer.

19. The method of claim 13, further comprising applying an overcoat over the second electrically non-conductive layer.

20. The method of claim 19, wherein the overcoat is a conductive electrostatic dissipation layer.

* * * * *